(12) United States Patent
Chen et al.

(10) Patent No.: US 10,860,891 B2
(45) Date of Patent: Dec. 8, 2020

(54) MEMORY-GUIDE SIMULATED PATTERN RECOGNITION METHOD

(71) Applicant: HOHAI UNIVERSITY, Jiangsu (CN)

(72) Inventors: Zhe Chen, Jiangsu (CN); Zhijian Wang, Jiangsu (CN); Wencai Hu, Jiangsu (CN); Xin Wang, Jiangsu (CN)

(73) Assignee: HOHAI UNIVERSITY, Jiangsu (CN)

( * ) Notice: Subject to any disclaimer, the term of this patent is extended or adjusted under 35 U.S.C. 154(b) by 42 days.

(21) Appl. No.: 16/323,113

(22) PCT Filed: Dec. 8, 2016

(86) PCT No.: PCT/CN2016/109001
§ 371 (c)(1),
(2) Date: Feb. 4, 2019

(87) PCT Pub. No.: WO2018/028102
PCT Pub. Date: Feb. 15, 2018

(65) Prior Publication Data
US 2019/0164013 A1 May 30, 2019

(30) Foreign Application Priority Data

Aug. 8, 2016 (CN) .......................... 2016 1 0643658

(51) Int. Cl.
*G06K 9/62* (2006.01)
*G06K 9/00* (2006.01)
(Continued)

(52) U.S. Cl.
CPC ....... *G06K 9/6256* (2013.01); *G06K 9/00369* (2013.01); *G06K 9/00765* (2013.01);
(Continued)

(58) Field of Classification Search
CPC combination set(s) only.
See application file for complete search history.

(56) References Cited

U.S. PATENT DOCUMENTS

| 8,649,558 B2 * | 2/2014 | Gleicher ............... G06T 3/0093 382/103 |
| 8,891,009 B2 * | 11/2014 | Lu ...................... G06K 9/00751 348/441 |

(Continued)

FOREIGN PATENT DOCUMENTS

| CN | 101311947 | * 11/2008 ............... G06K 9/62 |
| CN | 103793054 | 5/2014 |
| CN | 104461000 | 3/2015 |

OTHER PUBLICATIONS

International Search Report filed in PCT/CN2016/109001 dated May 3, 2017.

*Primary Examiner* — Zhiyu Lu
(74) *Attorney, Agent, or Firm* — Rankin, Hill & Clark LLP

(57) ABSTRACT

A memory-guide simulated pattern recognition method, wherein time sequence information in a memory prior to the current moment is introduced to detect motion information by means of pattern recognition using samples in the sequence as a reference is described. A memory invocation mechanism in a human brain is simulated, and different memory segments are used as elements to detect motion changes in multiple memory segments and the corresponding motion states; a memory attenuation mechanism is simulated, and motion detection results in multiple segments are combined to enhance motion change information in the current moment and form a motion state in a continuous time sequence, so as to form a motion detection result of the current moment as a pattern recognition result.

3 Claims, 3 Drawing Sheets

(51) Int. Cl.
*G06T 7/215* (2017.01)
*G06K 9/68* (2006.01)

(52) U.S. Cl.
CPC ............... *G06K 9/68* (2013.01); *G06T 7/215* (2017.01); *G06K 9/00348* (2013.01); *G06T 2207/10016* (2013.01)

(56) References Cited

U.S. PATENT DOCUMENTS

| | | | |
|---|---|---|---|
| 9,699,371 B1* | 7/2017 | Eslami | H04N 5/23212 |
| 10,074,015 B1* | 9/2018 | Grundmann | G06K 9/00765 |
| 2011/0134245 A1* | 6/2011 | Khizhnichenko | G06K 9/00791 |
| | | | 348/148 |
| 2013/0289824 A1* | 10/2013 | Mudalige | G08G 1/167 |
| | | | 701/41 |
| 2016/0078287 A1 | 3/2016 | Auge et al. | |

* cited by examiner

MEMORY-GUIDE SIMULATED PATTERN RECOGNITION METHOD

TECHNICAL FIELD

The present invention relates to a pattern recognition method, and more particularly, to a memory-guide simulate pattern recognition in a video sequence and a motion detection method.

BACKGROUND

A visual perception system of human has a prominent advantage in pattern recognition. A higher-level memory and selection system can enable the human vision to quickly focus on motion and continuous motion changes. This mechanism is realized through a global time sequence feature guidance in short-term memory and long-term memory, which is called memory guidance. Based on this mechanism, pattern recognition for continuous motion state is realized through fusing spatial positions and motion trajectories of targets at different moments. For example, in FIG. 1, the human perception system describes the scene as "a girl runs from the left to the right", "many vehicles move towards each other" and "two people walk together". It can be found that with the exception of "running girl", "moving vehicle" and "walking people", each description emphasizes pattern information such as motion trajectory up to the current moment in a continuous time sequence. However, most of the current machine vision, image processing and pattern recognition methods predict and detect a static spatial position of the target at the current moment, or only match the motion trajectory of the target. There is no method to simulate a human memory mechanism, which detects the spatial position of the current target while using a sequence segment as an element, and can trace back the patterns such as the motion trajectory, as shown in FIG. 1.

In addition, the pattern recognition in real and complex scenes still has a problem that the noise is difficult to be suppressed. The method of modeling all data in the sequence at one time is used in most of the current machine vision methods to identify the change of the motion pattern in the current frame. In this process, a lot of motion noises in the real scene are introduced into the result, and this motion noise is not only large and difficult to be suppressed, which seriously affects the accuracy of pattern recognition and motion detection results. A lot of works inspire us to solve this problem, such as a time filter that simulates visual center-periphery difference, a motion significance model based on spectral difference, etc. However, these models cannot describe the motion trajectory in the entire time sequence, and have weak ability to suppress motion noises, thereby resulting in more noise interference.

Benefiting from the development of the latest biological research, it is found that the pattern recognition of human vision depends largely on the historical experience in memory, and the global context information in short-term or long-term memory enables the pattern recognition to be more convenient and efficient. This finding highlights the important effect of the global context information on pattern recognition. This important effect is mainly reflected in the fact that it not only can accurately detect the motion change pattern and obtain the motion trajectory, but also can suppress the motion noises caused by camera shake and so on. Therefore, it is necessary to model this mechanism, a new pattern recognition model is invented to accurately detect the motion at the current moment and calibrate the motion trajectory, and in the final pattern recognition result, the motion change and the motion trajectory at the current moment and the historical moment in memory are accurately detected at the same time. The fundamental basis of the present invention lies in that the change caused by the motion is not only related to a sample adjacent to a time domain, but also related to the global context. Therefore, in addition to the short-term memory segment, the long-term memory segment also needs to be introduced into a pattern recognition process to obtain the change state of motion in the entire time sequence in one detection process.

SUMMARY

Object of the present invention: the present invention provides a memory guide simulated pattern recognition method in a time sequence to solve the problems existing in the prior art, which can obtain a target motion state in the entire time sequence in one recognition process, and can solve the problem that noises are difficult to be suppressed in motion detection of complex natural scene.

Technical Solution: a memory guide simulated pattern recognition method comprises the following steps.

S1: simulating a memory invocation mechanism and a process thereof to segment a historical time sequence and then combine the historical time segment with a frame at the current moment to form a sequence segment as an element for pattern recognition; for a video sequence, we can obtain multiple sequence segments that are independent of each other without overlapping and are processed in parallel;

S2: simulating a visual motion saliency detection mechanism and a process thereof to extract motion saliency in each sequence segment and obtain motion information in the short-term sequence by detection; for the time sequence in each memory segment, a visual motion significance model is used to detect motion changes in the sequence segment; and S3: simulating a memory decline mechanism and a process thereof to weigh the motion information in different segments, weigh and fuse the motion information among all the sequence segments, and output the motion information at the current moment and a motion trajectory in the entire time sequence as a pattern recognition result comprehensively.

For the motion detection result in each segment and in view of a time delay between the memory segment and the current moment, the motion detection result in the sequence segment with a larger time delay is deemed to have a weaker time correlation with the time of the current moment, and a corresponding weight value assigned is smaller; on the contrary, the motion detection result in the sequence segment with a smaller time delay is deemed to have a stronger time correlation with the time of the current moment, and a corresponding weight value assigned is larger. A motion detection accuracy at the current moment can be improved by weighted cumulative fusion, and the motion trajectory in a whole memory time sequence interval can be obtained, so as to comprehensively obtain an overall pattern recognition result.

Compared with the general pattern recognition method for integrally modeling the time sequence, the present invention conducts pattern recognition by using sequence segment as the element for motion detection and fusion. This strategy can accurately detect the motion information at the current moment and generate the track information of the motion state change in the entire time sequence, can calibrate the track and the time information of motion, and has the ability of suppressing motion noises.

DETAILED DESCRIPTION

The present invention is further described with reference to detailed embodiments, it shall be understood that these embodiments are only for the purpose of illustrating the present invention and are not intended to limit the scope of the present invention, and after reading the present invention, modifications of various equivalent forms of the present invention made by those skilled in the art fall within the scope defined by the appended claims of the present application.

Figure 1:
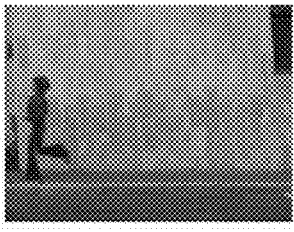
FIG. 1 is a schematic diagram of memory-guide pattern recognition.
Figure 2:
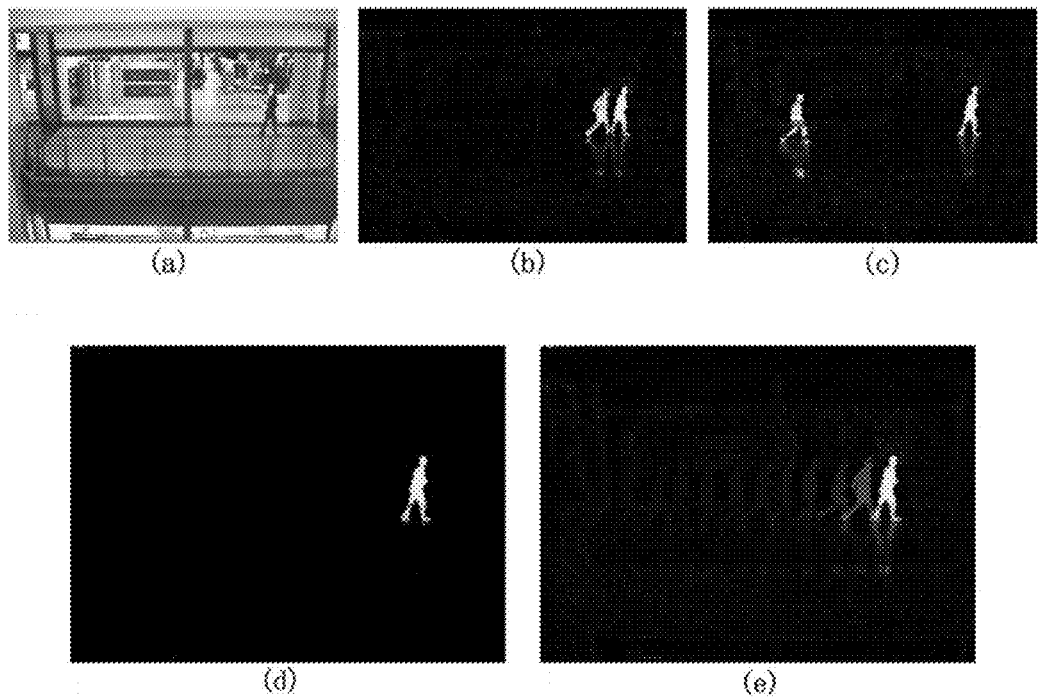
FIG. 2 is a flow chart of pattern recognition according to the embodiment of the present invention, (a) is a frame image at current moment in an input video sequence, (b) is motion detection in a short-term memory, (c) is motion detection in a long-term memory, (d) is motion detection in the frame image at the current time, and (e) is motion state in the entire time sequence.

As shown in FIG. 2, the embodiment shows a memory-guide simulated pattern recognition method. The present invention is proposed mainly on four biological findings: ①̂ a short-term memory can guide the recognition of sudden motion change recently; ②̂ a long-term memory can guide the recognition of stably occurred motion change; ③̂ a motion significance mechanism based on memory mostly focuses on a part where the motion change occurs in the short-term memory and the long-term memory, ignoring irrelevant background and sporadic noise information; ④̂ the motion information in the current moment and the motion state and state change (motion trajectory) in the entire time sequence in memory can be described through the interaction between memory and motion significance mechanism. According to the finding ①̂, the pattern recognition in the short-term memory shall be able to calibrate the motion information of those sudden changes occurring recently and suppress static background information (as shown in FIG. 2(b)). According to the finding ②̂, the pattern recognition in the long-term memory shall be able to calibrate the motion information stably occurring in a long time range (as shown in FIG. 2(c)) and suppress sporadic motion noises. According to the finding 3, pattern recognition results with the highest intensity are concentrated on those parts where the motion changes occur in the short-term memory and the long-term memory (as shown in FIG. 2(d)). According to the finding ④̂, the pattern recognition method shall be able to detect the track of the motion change in the entire time sequence in memory to accurately describe the motion state and the state change (as shown in FIG. 2(e)).

Figure 3:
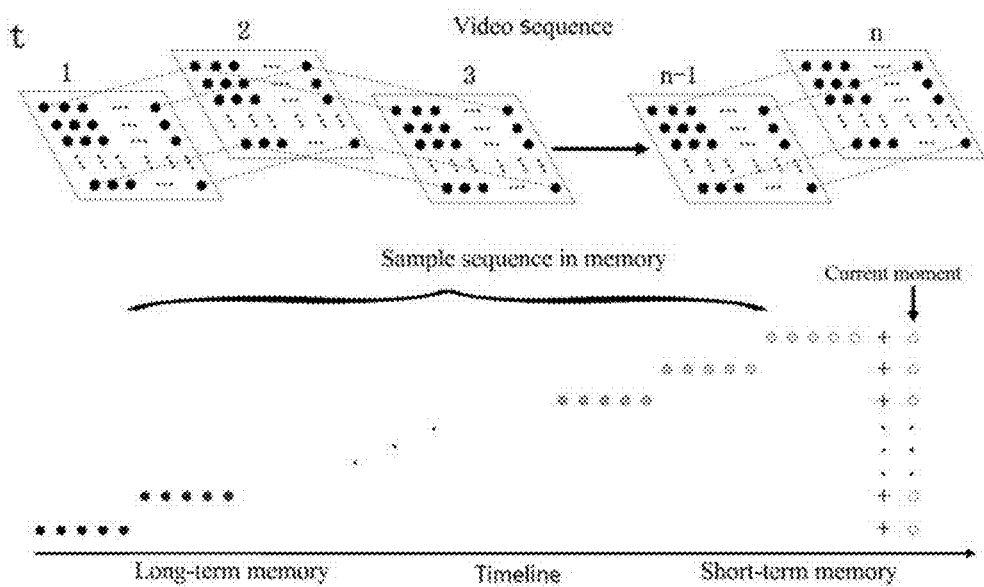
FIG. 3 is a schematic diagram of segmentation of the time sequence in the embodiment of the present invention.

Firstly, according to the findings ①̂ and ②̂, if a point is recognized as having a change in the motion pattern, then stable motion change of the point shall be detected in segments of both the short-term memory and the long-term memory. In order to simulate this mechanism, the time sequence in memory is firstly segmented, and continuous samples at the same spatial position and time are arranged to form a sequence segment. For the point at the current moment, the motion is only considered to occur at the position thereof in the case of difference from all the samples in memory. A segmentation process is shown in FIG. 3. For a point $x_n$ at the current moment, if the information of the point is different from the sample information stored in the memory, the motion change is considered to occur at the position of the point. Specifically, if $x_t$ is the point investigated at a moment t, the time sequence in 1 memory segments (a memory storage amount is l) can be obtained through combining $x_n$ and a sample $x_n^i$ in the memory at the current moment t=n. Therefore, for a point $x_n$ in the current moment, the corresponding sequence segment can be constructed as follows:

$$X_n^1 = \{x_n, x_{n-1}, x_{n-2}, x_{n-3}, \ldots, x_{n-k}\} \quad (1)$$

$$X_n^2 = \{x_n, x_{n-k-1}, x_{n-k-2}, x_{n-k-3}, \ldots, x_{n-2\times k}\}$$

$$X_n^3 = \{x_n, x_{n-2\times k-1}, x_{n-2\times k-2}, x_{n-2\times k-3}, \ldots, x_{n-3\times k}\}$$

$$\vdots$$

$$X_n^l = \{x_n, x_{n-(l-1)\times k-1}, x_{n-(l-1)\times k-2}, x_{n-(l-1)\times k-3}, \ldots, x_{n-l\times k}\}$$

where $X_n^i$ (i=1, 2, ..., l) is the sequence segment, $x_n$ is the point investigated at the current moment, $x_{n-1}, x_{n-1}, \ldots, x_{n-1}$ is the sample in the memory, k is a length of the time sequence (a minimum value is set as 16), and l is the memory storage amount (a minimum value is set as 10).

So far, the segmentation of all time sequences in the memory is completed.

In each sequence segment, the visual motion significance model based on time Fourier transformation is used to detect the motion information in each sequence segment. The visual motion significance model based on time Fourier transformation considers that the fluctuation of a phase spectrum in a time sequence frequency spectrum corresponds to the change of the sequence information in a time domain. Therefore, the motion information can be detected through calculating the phase spectrum. The method mainly comprises the following steps:

the first step is to construct a sequence segment consisting of a current time point and a historical moment sample:

$$X_n^i = \{x_n, x_{n-(i-1)\times k-1}, x_{n-(i-1)\times k-2}, x_{n-(i-1)\times k-3}, \ldots, x_{n-i\times k}\} i=1,2,\ldots,l \quad (2)$$

the second step is to calculate Fourier transformation and corresponding phase spectrum for the sequence segment:

$$f_n^i = F(X_n^i) p_n^i = \text{angle}(f_n^i) \ i=1,2,\ldots,l \quad (3)$$

the third step is to calculate inverse Fourier transformation for the obtained phase spectrum:

$$\Im_n^i = g(t) * F^{-1}(p_n^i) \ i=1,2,\ldots,l \quad (4)$$

where F and $F^1$ respectively indicates Fourier transformation and inverse Fourier transformation, $p_n^i$ represents the phase spectrum of the sequence segment $X_n^i$, $\Im_n^i$ is an inverse Fourier transformation result of the phase spectrum, and g(t) is a one-dimensional Gaussian filter (typical variance σ=5). In order to accurately detect the motion information and suppress the motion noises in the background, threshold filtering needs to be further conducted on $\Im_n^i$.

The fourth step is to conduct threshold filtering on an inverse transformation result of the phase spectrum, and if a value of $\Im_n^i$ is greater than a threshold value, the motion information appears at the corresponding position, otherwise, no motion change is considered:

$$S_n^i = \begin{cases} \|\mathcal{T}_n^i\| & \text{if } \|\mathcal{T}_n^i\| > T \\ 0 & \text{otherwise} \end{cases} \quad i = 1, 2, \ldots, l \quad (5)$$

where T is the threshold value, and a typical value is set as:

$$T = \mu_n^i + 2 \times \rho_n^i \quad (6)$$

where and $\mu_n^i$ and $\rho_n^i$ are respectively an average value and a variance of $\bullet_n^i$.

Figure 4:
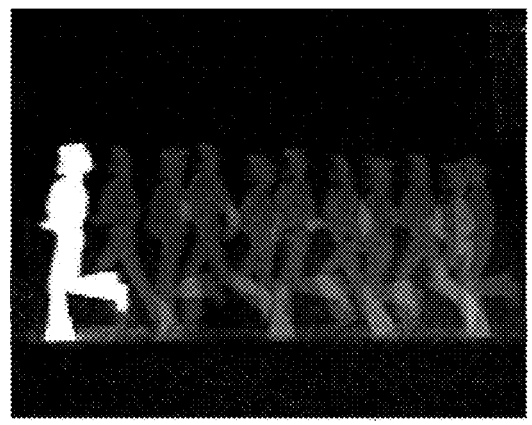
FIG. 4 is results of motion detection and pattern recognition accumulated in the embodiment of the present invention.

Then, according to the finding $\hat{3}$, motion detection results in multiple sequence segments are fused to form a memory-guided motion detection result, taking into account not only the sudden motion change in the short time but also the stable motion change in the long time. This mechanism can be formally modeled as the accumulation of motion detection results in all l sequence segments:

$$E_n = \frac{1}{l} \sum_{i=1}^{l} S_n^i \quad (7)$$

where $E_n$ is the accumulation of the motion detection results. The obtained results are shown in FIG. 4: the point with the greatest intensity in the obtained motion detection result diagram (FIG. 4) corresponds to the motion information at the current moment, and the intensity decreases with the continuation of time. Therefore, the motion detection result diagram $E_n$ can be segmented through the method based on gray histogram. Through this calculation, motion information $S_n$ only for the current moment can be obtained as a result of pattern recognition at the current moment. So far, the detection of the motion information at the current moment is completed, and the pattern at the current moment can be recognized.

According to the finding $\hat{4}$, the intensity of the motion information in human brain shall decrease with time, which is called memory decline. The present invention adopts a weighted method to simulate the decline mechanism. For any sequence segment, the intensity corresponding to the detected motion information is inversely proportional to the time delay between the segment and the current moment. This weight and decline can be calculated as follows:

$$w_n^i = \frac{\alpha}{i} \quad \tilde{S}_n^i = w_n^i S_n^i \quad (8)$$

where $w_n^i$ is the weight corresponding to the motion detection result in the $i_{th}$ segment, a is a modulation parameter, and a value range is 0<α<1. Since the intensity of $\tilde{S}_n^i$ decreases with the increase of time delay, the time when the motion occurs can be calibrated.

In addition, according to the finding $\hat{4}$, the motion information at the current time can be combined with the motion information at the historical moment to form the motion trajectory, and the present invention formally simulates this mechanism as the accumulation of motion information after decline:

$$\tilde{S}_n = \frac{1}{l} \sum_{i=1}^{l} \tilde{S}_n^i \quad (9)$$

where $\tilde{S}_n$ is a motion trajectory diagram. In order to suppress the noises introduced in a track generation process and a motion information decline process, the original motion detection cumulative result is multiplied with the declined motion detection cumulative result:

$$\hat{S}_n^i = \tilde{S}_n \times E_n \quad (10)$$

where $\hat{S}_n^i$ is the track after noise suppression, and the obtained result is shown in FIG. 2(*e*).

So far, the matching and characterization of the motion trajectory at all moments in the memory are completed, and the recognition of the motion trajectory and the motion state at the historical moment is completed.

The invention claimed is:

1. A computer implemented memory-guide simulated pattern recognition method, implemented via a processor, comprising the following steps:
   S1: simulating, via the processor, a memory invocation mechanism and a process thereof to segment a historical time sequence and then combine the historical time segment $x_n^i$ with a frame at the current moment $x_n$ to form a sequence segment as an element for pattern recognition, wherein i is a memory storage amount and n is a time step associated with the current moment;
   S2: simulating, via the processor, a visual motion saliency detection mechanism and a process thereof to extract motion saliency in each sequence segment and obtain motion information in the short-term sequence by detection based on a visual motion significance model determined based on a time Fourier transformation, wherein fluctuation of a phase spectrum in a time sequence frequency spectrum corresponds to the change of the sequence information in a time domain; and
   S3: simulating, via the processor, a memory decline mechanism and a process thereof to weigh the motion information in different segments, fuse the motion information among all the sequence segments, and output the motion information at the current moment and a motion trajectory in the entire time sequence as a pattern recognition result comprehensively.

2. The memory-guide simulated pattern recognition method according to claim 1, wherein a sequence segment based motion detection strategy is proposed by simulating the memory invocation mechanism, which segments a historical sequence and then uses a combination of a sequence segment and the frame at the current moment as an element for motion detection;
   specifically, for an image frame at the current moment t in a video sequence, successive frames among 1, 2, . . . , t−1 are segmented according to a length k, and the motion changes in each sequence segment are detected by simulating the visual motion saliency mechanism and a detection result is a pattern recognition result for each sequence segment.

3. The memory-guide simulated pattern recognition method according to claim 1, wherein in the step of simulating the memory decline mechanism, for the motion detection result in each segment and in view of a time delay between a moment of the sequence segment and the current moment, the motion detection result in the sequence segment with a larger time delay is deemed to have a smaller temporal correlation with an event of the current moment, and a corresponding weight value assigned is smaller;
  on the contrary, the motion detection result in the sequence segment with a smaller time delay is deemed to have a stronger temporal correlation with the event of the current moment, and a corresponding weight value assigned is larger; and
a motion detection accuracy at the current moment can be improved by cumulatively fusing the weighted motion detection results, and the motion trajectory over a whole time interval in the memory can be obtained, so as to comprehensively obtain an overall pattern recognition result.

\* \* \* \* \*